United States Patent [19]
Fisher et al.

[11] Patent Number: 5,153,830
[45] Date of Patent: Oct. 6, 1992

[54] METHOD AND APPARATUS FOR PROVIDING ASSISTANCE WITH RESPECT TO THE DEVELOPMENT, SELECTION AND EVALUATION OF IDEAS AND CONCEPTS

[75] Inventors: Marshall D. Fisher; Jesse Fisher, both of Newport Beach, Calif.; James Bufalini, Jr., Honolulu, Hi.; Alexandra Robbin, Minneapolis, Minn.

[73] Assignee: Fisher Idea Systems, Irvine, Calif.

[21] Appl. No.: 379,440

[22] Filed: Jul. 12, 1989

[51] Int. Cl.⁵ .............................................. G06F 7/00
[52] U.S. Cl. ..................................... 364/419; 434/236
[58] Field of Search ......................... 364/419; 434/236

*Primary Examiner*—Gail O. Hayes
*Attorney, Agent, or Firm*—Blakely, Sokoloff, Taylor & Zafman

[57] ABSTRACT

A computerized aid to creativity and problem solving to help speed up the creative process using an interactive database comprised of two major parts, or functions. The first part is a database of several thousand questions for clarifying the task, modifying ideas, and evaluating goals, ideas, and outcomes. The second part is a database or more than 60,000 words and phrases expressing the shared concepts of a particular culture, namely American, and more than 650,000 idea associations-to which any number of a user's personal, idiosyncratic connections can be added. The invention utilizes principles of association, memory retrieval, and analogical reasoning. Whether taken literally or as figures of speech, the two databases prompt a user to make his or her own connections by reminding the user of thoughts, feelings, experiences, facts, and images stored so deeply in memory that they normally cannot be retrieved at will. When the user comes up with his own associations, the invention allows these associations to be added to those already present.

7 Claims, 2 Drawing Sheets

… …

5,153,830

METHOD AND APPARATUS FOR PROVIDING ASSISTANCE WITH RESPECT TO THE DEVELOPMENT, SELECTION AND EVALUATION OF IDEAS AND CONCEPTS

SUMMARY OF THE INVENTION

The present invention is a computerized aid to creativity and problem solving to help speed up the creative process.

Highly creative people know that to get one topflight idea, many ideas must be thought of and considered, and that to get many ideas, it is necessary to mix and match, compare and contrast, recombine and identify old ideas into fresh, new combinations. A decision must be made as to which ideas should be given further thought, selected ideas must be put to the test, and the results evaluated.

The present invention is an interactive database comprised of two major parts, or functions:

1) QBank: An organized storehouse (database) of several thousand questions for clarifying the task, modifying ideas, and evaluating goals, ideas, and outcomes;

2) IdeaBank: An organized storehouse (database) of more than 60,000 words and phrases ("Idea Words and Phrases") expressing the shared concepts of a particular culture, namely American, and more than 650,000 idea associations to which any number of a user's personal, idiosyncratic connections can be added.

The foundation of the invention rests on principles of association, memory retrieval, and analogical reasoning (use of analogies). Whether taken literally or as figures of speech, the Idea Words and Phrases and the QBank questions prompt a user to make his or her own connections.

This is accomplished by reminding the user of thoughts, feelings, experiences, facts, and images stored so deeply in memory that they normally cannot be retrieved at will. When the user comes up with his own associations, the invention allows these associations to be stored along with those already in the system.

BRIEF DESCRIPTION OF THE DRAWINGS

FIG. 3 is a block diagram showing the environment of the invented system.

DETAILED DESCRIPTION OF THE INVENTION

Figure 1:
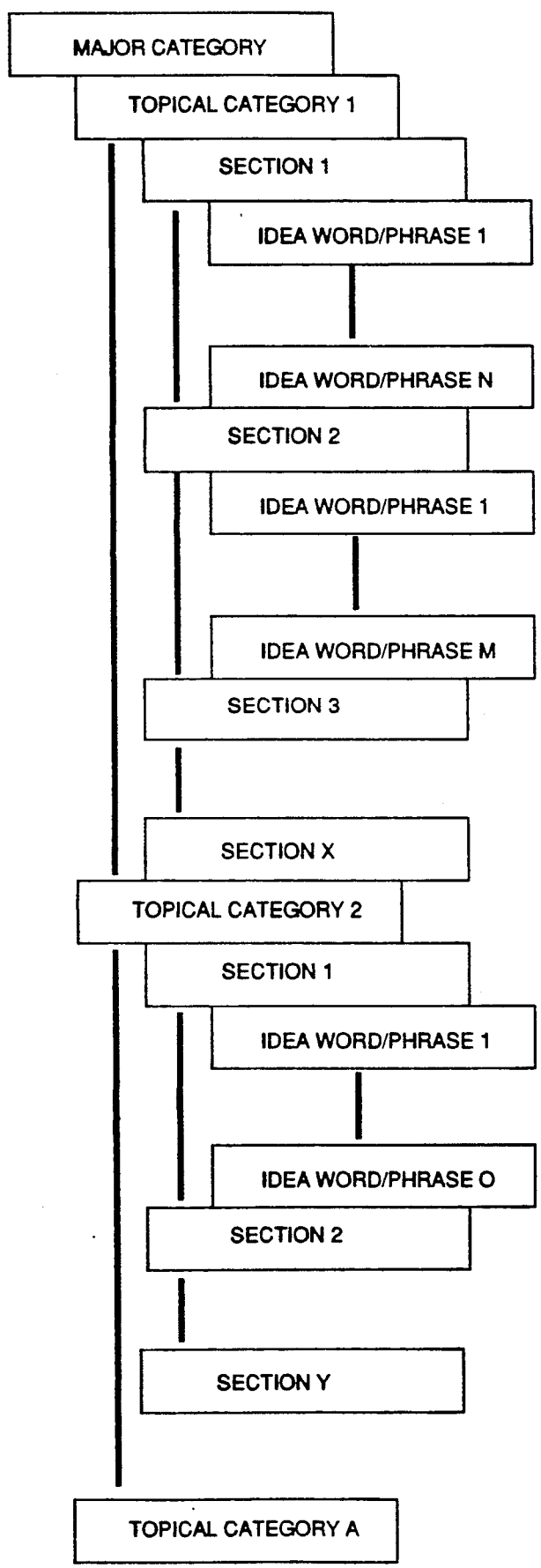
FIG. 1 is a logical representation of a single major category with its associated topical categories and ideal word phrases.

The present invention is an interactive database comprised of two major parts, or functions:

1) QBank An organized storehouse (database) of several thousand questions for clarifying the task, modifying ideas, and evaluating goals, ideas, and outcomes;

2) IdeaBank: An organized storehouse (database) of more than 60,000 words and phrases ("Idea Words and Phrases") expressing the shared concepts of a particular culture, namely American, and more than 650,000 idea associations to which any number of a user's personal, idiosyncratic connections can be added.

OBANK COMPONENTS

The QBank is a database of questions, the answers to which can serve as a guide to a user to obtain the most efficient use of the IdeaBank. However, the QBank need not be accessed in order to use the IdeaBank. Questions are grouped into three divisions as follows:
 Orientation-Clarification
 Modification
 Evaluation Each division contains different sets of questions, or question categories.

The Orientation-Clarification division is for identifying aims and elements of the task and for clarifying a goal and various parts of the problem to be solved. The Orientation-Clarification division contains question categories such as:
 Developing a Story or Script
 Developing a New Product or Service—Modifying a Product or Service
 Developing a Name, Title, Theme, or Slogan
 Developing a Marketing Strategy or Promotional Campaign
 Developing an Advertisement
 Developing a Solution to a General Problem
 Adding a Personal Association The user selects the question category that most nearly fits his purpose. For example, if writing a business plan, the user would choose the Developing a Marketing Strategy or Promotional Campaign question category.

The Modification division is for altering, adapting, shaping, and reshaping ideas and potential solutions. The Modification Division contains twenty-six question categories, each representing a class of ways in which something might be altered or adapted to create something new as follows:
 Action—Motion
 Age
 Appearance—Color—The Senses
 Combining—Synthesizing
 Comparing—Contrasting—Similarities—Differences
 Decreasing—Subtracting—Shrinking
 Increasing—Adding—Expanding
 Emotions—Attitudes—Behavior
 Materials
 Mechanization—Automation—Power (Energy/Force)
 Opposites—Reversals
 Perspective—Point of view
 Position—Location—Distance—Direction
 Processes
 Purpose—Function
 Removing—Eliminating
 Separating
 Sequence—Arrangement
 Shape
 Size—Weight
 Speed
 Strength
 Substituting—Replacing
 Temperature
 Time—Timing
 Transformation—Change The Evaluation division is for assessing goals, assumptions, ideas, potential solutions, and actual outcomes. Evaluation questions are pertinent anytime, but especially at planned points at the beginning, middle, and end of a project. The Evaluation division contains twelve question categories representing criteria for assessing a goal, an assumption, an idea, a process, or an outcome as follows:

criteria for assessing a goal, an assumption, an idea, a process, or an outcome as follows:

Aims—Purposes
Attractiveness—Interest—Appeal
Costs—Benefits—Success—Failure—Risk
Ecology—Environment
Efficiency—Effectiveness
Feasibility—Practicality
Fruitfulness
Human Concerns—Social Concerns
Originality
Simplicity—Complexity
Taking Stock—Midproject Review
Implementation Whether in Orientation-Clarification, Modification, or Evaluation, the answers to the questions can be searched and key concepts which have generated can be identified. A list of the key concepts can then be used to decide what to pursue first when accessing IdeaBank and what to save for later.

The present invention organizes the Orientation-Clarification, Modification and Evaluation divisions in a single file organized into the questions categories described above having one record for each question.

IDEABANK COMPONENTS

The IdeaBank is logically structured as a hierarchy of subject matter as follows:

28 Major Categories (MCs)—each containing 5 to 50 Topical Categories;
373 Topical Categories (TCs)—each containing Idea Words and Phrases divided into up to 9 Sections; and Approximately 60,000 Idea Words and Phrases (the Alpha).

A. Major Categories

The 28 Major Categories may be thought of as concepts common to American (and other national) culture. The Major Categories fit into three conceptual groupings: 1) the physical world; 2) people, health, emotions, and intellect; and 3) actions, comparisons, and attributes. Items which fit into each of the three conceptual groupings are as follows:

1) The Physical World
   Agriculture-Plants Planting
   Animals
   Business—Industry—Occupations—Money
   Clothing—Jewelry—Grooming
   Communication—Education—Entertainment—The Arts
   Energy—Machinery—Technology
   Fasteners—Containers—Storage
   Foods—Beverages—Cooking—Eating
   Government—Law—Politics
   Living Quarters—Furnishings
   Materials—Chemicals—Gases
   Military—War
   Places
   Sports—Recreation—Hobbies
   Structures—Repair—Construction
   Transportation—Travel
   Weather
2) People, Health, Emotions and Intellect
   Emotions—Behavior—Personality
   Health—Anatomy—Medicine—The Senses
   Mind-Intellect 'Peoples—Families—Personal Relationships—Life Cycle
   Philosophy—Religion—The Occult 3) Actions, Comparisons and Attributes
   Actions—Motions
   Color
   Comparison
   Measurement
   Shape
   Time

B. Topical Categories

As presently implemented, there are 373 Topical Categories, each comprised of up to 9 Sections of related/associated entries with an associated code which will be explained below. The number of entries for each Section varies in size from approximately 10 to 500 entries with the total number of entries for a Topical Category varying from 250 to 2,500 entries. While the number of Sections comprising a Topical Category varies, the order is always the same. In other words, although all of the following Sections do not appear within each Topical Category, the Sections, with their associated codes, are arranged in the following order:

Kinds or Varieties/Examples (Code varies, but is one of P, T, N, V, A, D or M)
  People/Animals (Code P)
  Things/Places (Code T)
  Parts or Parts/Materials or Supplies/Equipment (Code T)
  Abstractions/Intangibles (Code N)
  Verbs (Code V)
  Activities/Events/Processes (Code A)
  Descriptors (Code D)
  Miscellaneous (Code M)

Some entries in Topical Category Sections appear with a +symbol following the entry ("plus words"). They include, but are not limited to, the title words in Topical Categories. For example, plus words for the Topical Category shoes/boots include shoes, boots, and footwear. Plus words act as windows to related Topical Categories. For example, through the plus words headgear and clothing, both found in the shoes/boots Topical Category, a user can get to the Topical Categories headgear/masks/neckwear and clothing/fashion/style, which list entries related to shoes and boots.

The Section referred to as "Kinds" usually is a listing of examples of the same things, activities, qualities, etc., while the Section referred to as "Varieties/Examples" is a broader grouping.

For example, in the Topical Category gold/silver, Kinds#1 (gold) includes:
  fool's gold—T
  pure gold—T
  scrap gold—T
  yellow gold—T These entries are all types of gold and are united by the common word "gold" in each entry.

In the Topical Category jewelry/gems, Varieties/Examples#12 (famous gems) includes:
  Cartier diamond (Burton to Taylor)—T
  Koh-i-noor diamond—T
  Pearl of Allah (Pearl of Lao-tzu)—T
  Rosser Reeves ruby—T These entries are all gems and include several examples of different famous gems.

The remaining Sections will be described below as part of the description of the Alpha Coding System.

In general, words are listed in a Topical Category if their association with the Topical Category subject is strong and considered to be common knowledge. Word associations are perceived connections between two ideas. The associations in the database reflect American culture. Entries and associations are ones that users might read about in the newspaper or popular magazines, or hear on television. They are not necessarily "true." Words that are directly related to the Topical Category title words form the basis of the Topical Category. They include entries that represent specific examples, causes, effects, uses, users, doers, receivers, locations, and descriptions. Topical Categories are grouped in the Major Categories. For example, the Major Category Animals includes the following Topical Categories:

birds/fowl
   dogs/cats/family pets
   fishes/marine mammals/crustaceans
   horses/horseback riding/horse-drawn vehicles
   insects/spiders/worms
   mammals/wild animals/domesticated animals
   reptiles/amphibians/dinosaurs
   faces/facial expressions/heads
   hair/feathers/baldness
   limbs/appendages
   mouth/teeth/lips/dental care
   skin/complexion
   body fluids/bodily wastes
   hearing/ears/sounds/silence
   seeing/eyes/blindness/vision aids
   smelling/nose/odors
   sexuality/reproduction
   wild/uncivilized/tame/domesticated The first seven Topical Categories have the concept "animals" as their primary focus. The remaining Topical Categories include entries relevant to animals but are not only about animals. For instance, the Topical Category hair/feathers/baldness has many entries about animal fur and bird feathers, but it also includes entries about human hair and baldness.

Topical Categories may be included in more than one Major Category. For instance, the Topical Category sexuality/reproduction is in three Major Categories: Animals, Peoples-Families-Personal Relationships-Life Cycle, and Health-Anatomy-Medicine-The Senses.

C. The Alpha

The Alpha is an alphabetical list of approximately 60,000 base words and phrases which appear in one or more Sections, with an associated code. The list also includes each Topical Category without an associated code. The words and phrases and Topical Categories in the Alpha are alphabetized letter by letter, ignoring spaces and special characters like "—". For example, words beginning with "cross" appear as follows:

cross brace—T
   crossbreed—V
   cross-burning—A
   cross fire—A
   crossing the desert—A
   cross knot—T Alpha Coding System—Each individual base word or phrase entry is coded according to the Section to which it most closely relates as follows:

1. People/Animals (Code P). Includes living, dead, real, fictitious, and imaginary people and animals, and gods and goddesses.

2. Things/Places (Code T) All or part of a real or imaginary place or thing. Entries usually represent a tangible concrete, visible place or thing. In addition, all diseases are coded T.

3. Abstractions/Intangibles (Code N). These entries represent abstractions--intangible nouns such as shapes, sounds, time, parts of speech, and qualities.

| Examples | Related examples with different codes |
|---|---|
| mathematics; number; angle; quantity; capacity; area; dry measure; size; shape; algebra; value; multiplication table; serial number; | multiplication sign - T volume (sound) - N seat number - T account number - T multiplication (math) - A numeral - T |

D. Verbs (Code V)

Single words or phrases which are verbs or a verb plus a noun (but which do not describe activities, events or processes which are Code A).

E Activities/Processes/Events (Code A)

Nouns and noun phrases which usually suggest movement or process. Frequently are gerunds-which without the "ing" suffix are coded as Verbs.

F. Descriptors (Code D)

Includes adjectives, adverbs, and descriptive phrases.

G. Miscellaneous (Code M)

Miscellaneous items are items which do not easily fit into one of the other Sections and are best explained by way of example as follows:
   Quotations and phrases
   Historical events
   Names, acts, treaties, pacts
   Titles of books, songs, movies, etc.
   Opening lines of nursery rhymes, poems, etc.
   Company names, governmental organizations
   Speeches The present invention organizes the Major Categories, Topical Categories, Sections and Idea Words and Phrases in a single file having approximately 60,000 records, i.e., each base word or phrase comprising the Idea Words and Phrases, each Major Category and each Topical Category. Each record contains pointers to other records wherein the pointers are Topical Categories (for base Idea Words and Phrases), Major Categories (for Topical Categories) and Sections (for Topical Categories). An illustration showing this file structure hierarchy is shown in FIG. 2. By way of illustration, the Major Category "colors" comprises the following Topical Categories:

colors/colorful
   red/pink
   yellow/orange
   green/greenish
   blue/purple
   white/pale
   gold/silver
   brown/tan
   black/gray
   clear/opaque/translucent
   lighting/light sources/shade/darkness Further, the Colors Topical Category "Red/Pink" comprises the following Sections:
   Varieties/Examples
   People/Animals Things/Places
Abstractions/Intangibles
Verbs
Activities/Events /Processes
Descriptors
Miscellaneous p Still further, the Section "Varieties/Examples" comprises the following Idea Words and Phrases:
auburn
bay (color)
burgundy (color)
carmine
crimson
dusty rose
fuchsia (purplish-red)
hot pink
hunter's pink (brilliant red)
magenta
maroon (color)
pinkish+
red as a beet
reddish+
red-orange
rosy
ruby (deep red)
russet (deep brown)
scarlet
shell pink
shocking pink
sorrel (reddish brown)
Titian red
vermillion It should be noted that the items in parenthesis are used to assist the user with respect to words having synonyms which may be unrelated to the Topical Category (e.g. burgundy) or whose meaning may not be generally known (e.g. russet). It should also be recognized that assigning particular words and phrases to particular Sections is based upon a determination which is at least partially subjective at the time the database is created. Similarly, due to the subjective nature of defining the particular Sections, Topical Categories and even the Major Categories, changes in the database may occur over time as experience is obtained or as the meanings of various words changes over time or as new words become part of the English language. For this reason, the specific details regarding the contents of the database are not needed to obtain a proper understanding of the invention, and such details are described herein only as necessary to obtain an understanding of the invention.

Referring again to FIG. 2 showing the logical hierarchical structure for one of the twenty eight major category records, the record comprises Topical Category I which itself comprises Section 1 which itself comprises Idea Word/Phrase 1 through Idea Word/Phrase N where N is the number of Idea Word/Phrases in Section 1. Similarly, Section 2 comprises Idea Word/Phrase 1 through Idea Word/Phrase M where M is the number of Idea Word/Phrases in Section 2. Similarly, Topical Category I contains Section 3 through Section X, each of which contains its own set of Idea Word/Phrases (not shown in FIG. 1). Following Section X of Topical Category 1 is Topical Category 2 which itself comprises Section 1 through Section Y, again, each Section containing its own set of Idea Words/Phrases. The remaining Topical Categories through Topical Category A are organized in a similar fashion within each Major Category. The Alpha is a second file which as noted above is an alphabetical list of Idea Words and Phrases and Topical Categories. A database programming environment which is well suited for the foregoing record structure is a product sold under the trademark Advanced Revelation by Revelation Technologies which may be implemented on personal computers such as IBM PC/ATs and compatibles.

Although there are many ways in which the user interface may be implemented, in a preferred embodiment, the interface utilizes a set of hierarchical menus and a set of windows within which commands may be entered and data displayed. In this connection, referring now to FIGS. 2a-2e, the present invention will be described with reference to a particular menu/window interface. However, it should be understood that the specific interface described is for illustration purposes only and is not intended to limit the invention.

Figure 2C:
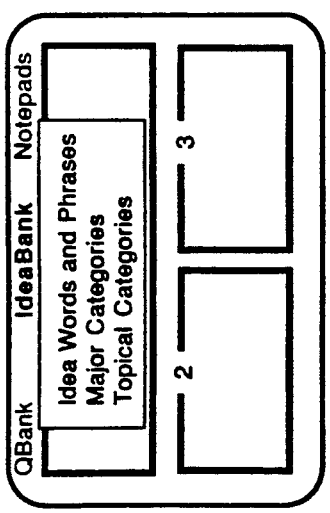
FIG. 2a-2e are views of selected screen displays utilized by the present invention.
Figure 2B:
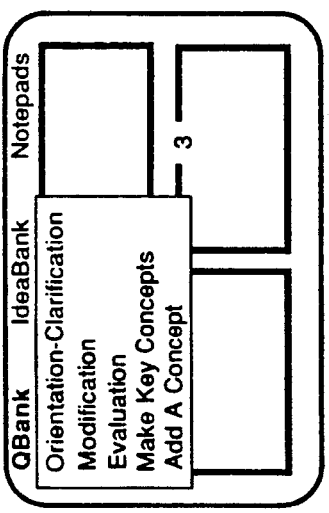
Figure 2A:
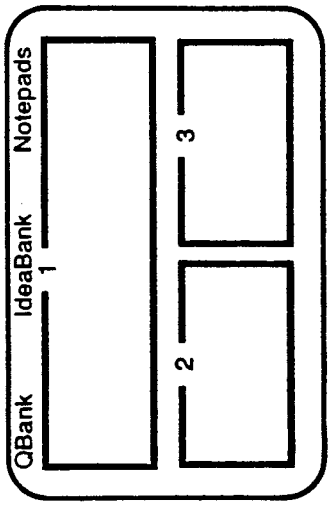

FIG. 2a shows a screen display incorporating the menu item QBank, Idea Bank and Notepads below which appears a large window 1 and smaller windows 2 and 3. Assuming that the user selects the menu item QBank, a QBank sub menu is displayed as shown in FIG. 2 containing the sub menu items Orientation/Clarification, Modification, Evaluation and Make Key Concept. By selecting one of the Orientation/Clarification, Modification or Evaluation sub menu items, a list of question categories for the selected division is shown in a further sub menu. Selecting a desired question category displays another sub menu listing the titles of the groups of question within that question category Then selecting one of the titles causes the initial question within that group of questions to appear in window 1. Once a question appears, it may be selected and answered by typing, for example, in window 2 which creates a Question Notepad file containing the question and the typed answer. After answering the first question, subsequent questions may be displayed by pressing a next question key which may be, for example, a down arrow, or a page down key. To return to a question, the user may press a previous question key which may be implemented as, for example, an up arrow or page up key. As noted above, once a suitable question is located, it is selected which causes the question to be placed into window 2 at which time the user may type in an answer to the question. Once the question has been answered, the user returns to the question mode by, for example, by pressing the escape key which causes the next question to be displayed in window 1. Additional questions may then be displayed in a like manner by pressing the down arrow or page down key until the next question which is desired to answer appears.

Once all appropriate questions have been answered for the selected division, the user again selects the QBank menu item and when its sub menu appears, selects one of the other divisions (i.e. Orientation/Clarification, Modification or Evaluation) or the sub menu item Make Key Concept. If Make Key Concept is selected, a search is conducted in the Question Notepad file and all filler words (such as the, an, and, etc.) are ignored and the remaining words are displayed in window 3 in order of frequency of appearance. Once the key concepts have been determined, the user may then select each key concept which is desired to be kept which are then copied onto another file called the Idea Notepad for use when accessing the IdeaBank.

Figure 2E:
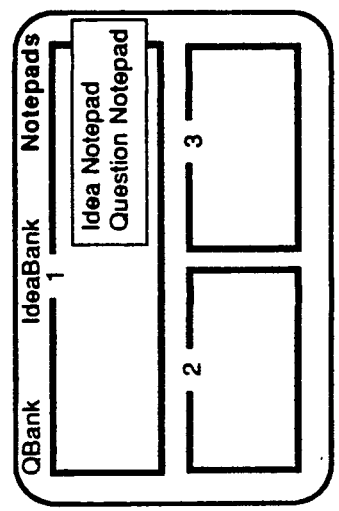
Figure 2D:
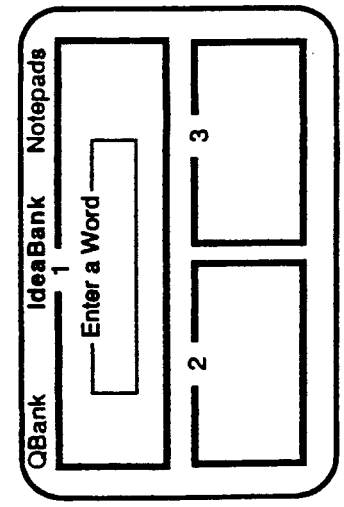

While it is not necessary to use the QBank or to create an Idea Notepad before accessing the IdeaBank, any words or phrases which appear in the Idea Notepad may be utilized to access the IdeaBank. The IdeaBank is accessed by selecting the IdeaBank menu item which causes a sub menu to appear as shown in FIG. 2c. By selecting the sub menu item Idea Words and Phrases, a box appears for entering a word or phrase as shown in FIG. 2d. By typing into the box a word or phrase (for example a word from the Idea Notepad), an index will be shown in window I containing the place within the Alpha, which as noted above is an alphabetized list of all the idea words and phrases, where the entered word or phrase is located. If the word or phrase is not in the list, the alphabetized index is shown at the place where the entered word or phrase would be located. Once a desired idea word or phrases located, it may be selected. If the selected item is not followed by a plus sign (i.e., it is a phrase word and not part of a Topical Category title), window I will list the Topical Categories that contain the selected Idea Word or Phrase. At this point, a Topical Category can be selected. If the selected word is followed by a plus sign, a sub menu will appear for the corresponding Topical Category listing the first five Section titles within that Topical Category, one of which may be selected, or additional Section titles may be listed by scrollinq through the sub menu.

The displayed index may be scrolled up and down to examine the word surrounding the place where the word is located or would be located if present. In a preferred embodiment of the invention, the displayed index is a subset of the Alpha file wherein the subset is all words and phrases in the file whose first two letters match the first two letters of the word or phrase in the box shown in FIG. 2d. The Section title listed in window 1 may be selected which will result in the associated listing within the selected section being displayed in window 2 or window 3. The window may include a title bar which will state the title of the section which was selected. By pressing, for example, a home key, another section of the Topical Category may be selected, or the user may return to the Topical Category level by selecting window 2. Windows 2 and 3 display the related Section of the Topical Categories, either of which may be frozen to prevent it from being over written in which case the other window is used to search (a) the contents of other Section of same Topical Category or (b) the contents by Section of other Topical Categories.

Referring again to FIG. 2c, if the Major Categories sub menu item is selected, a scrollable list of the Major Categories appears in window 1. A particular Major Category may be selected and copied to the Idea Notepad or selected to display The Topical Categories it contains, a listing of which will then replace the Major Category listing in window 1. Once the Topical Categories are listed, the Idea Words and Phrases of a particular Topical Category may be viewed by selecting that Topical Category.

If the Topical Category sub menu choice is selected, a scrollable listing of the approximately 373 Topical Categories is displayed in window 1. The name of a particular Topical Category may be selected and copied to the Notepad or selected so that its contents are displayed. If a particular Topical Category is selected for viewing, a further sub menu appears displaying the Sections comprising the selected Topical Category in a scrollable list. By selecting a desired section, the Idea Words and Phrases comprising that Section will appear in window 2 or window 3. Generally, as subsequent Sections are selected, its idea Words and Phrases appear in window 2 or 3 depending upon which window contains the most recent selection. More specifically, if selecting different Sections within a particular Topical Category, each new Section selected is displayed in the same window replacing the previously selected Section unless the user freezes that window in which case subsequently selected Sections go into the other window. However, when searching different Topical Categories, the window assignments alternate with each new Topical Category selected being assigned to the window other than the one currently in use. At any time, Topical Categories, Sections or Idea Words or Phrases can be copied to the Idea Notepad for later viewing.

In this manner, to call up the association for a particular Idea Word or Phrase when viewing a Section of a Topical Category, by selecting the desired Idea Word or Phrase, if the selected Idea Word of Phrase is not part of the name of the Topical Category (that is, it is not followed by a +sign), window 1 will list all the Topical Categories in which the selected Idea Word or Phrase appears. That is, window 1 lists the Topical Categories which are associated with the selected Idea Word or Phrase. If a selected Idea Word or Phrase is part of the name of the Topical Category i.e., it is followed by a +sign, instead of listing the associated Topical Categories in window 1, the Topical Category that has the selected Idea Word or Phrase in its title will appear and a sub menu containing its Sections will then appear allowing the user to select one of the Sections so that its Idea Words and Phrases can be viewed as described above.

As noted above, by selecting a QBank sub menu, a question Notepad is created and by selecting an IdeaBank sub menu, an Idea Notepad is created. These Notepads can be saved for later use or a previously saved Notepad can be retrieved for current use by selecting the Notepads menu which causes a sub menu to appear containing the sub menu choices Idea Notepad and question Notepad as shown in FIG. 2e. When the Idea Notepad is selected or the Question Notepad is selected, another sub menu appears specific to the selected Notepad containing the choices Edit Notepad, Load Notepad, Save Notepad, Delete Notepad, Print Notepad, Save ASCII file and Load ASCII file. For example, Edit Notepad allows the user to edit a previously created Notepad using word processing techniques such as insertion, deletion and the like. Load Notepad, Save Notepad and Delete Notepad perform load, save and delete functions on files being utilized as Notepads. Similarly, Print Notepad sends a Notepad file to a printer. Save ASCII file and Load ASCII file save and load text files respectively as a Notepad file.

The present invention also provides the capability of adding existing Idea Words and Phrases to existing Topical Categories when a user feels that such addition is needed to express his own understanding. Additionally, words and phrases may be added to existing Topical Categories. Further, new Topical Categories may be added which may be filled with existing Idea Words and Phrases as well as added Idea Words and Phrases. In this manner, it is possible to create a customized version of the Idea Bank database which expresses the user's own personality, own experiences and own specialized knowledge.

Adding a new word or phrase to the Idea Bank is accomplished by selecting the Idea Bank on the menu bar as shown in FIG. 2b and selecting the Add A Concept choice. At this point, a prompt will appear to enter the concept to be added which would then be entered in the appropriate place in the file.

FIG. 3 shows the physical arrangement of the various components needed for a user to interact with the Idea Bank and the QBank. Specifically, the user would type the various entries and make the menu choices using keyboard 11. CPU 13 with the program stored in RAM 15 would cause the program to be executed according to the keyboard entries and display the appropriate information on display terminal 17 by accessing disk drive 19 where the IdeaBank, QBank, the Alpha and the Notepad files are located.

What is claimed is:

1. An interactive system for aiding human beings in the development, selection and evaluation of ideas and concepts comprising:

a) storage means including a mass storage device and a random access memory for storing a first database organized into a set of records of major categories of concepts relating to a particular culture, each major category record including a set of topical categories relating to the major category, each topical category including a set of sections relating to the topical category, and each section including a set of idea words and phrases relating to the section, said storage means also storing a second database organized into a set of records comprising said idea words and phrases relating to each of said sections;

b) processing means coupled to said random access memory for executing a computer program loaded into said random access memory, said program adapted to create said first database and said second database, said program further adapted or retrieve from said mass storage device at least one of said major category records based upon an operator input and to display on a display means at lease one of i) a list of said major categories; ii) a list of said topical categories; iii) a list of said set of sections for at least one of said topical categories; and iv) a list of said idea words and phrases for a predetermined one of said sections, said computer program having the further capability of retrieving from said storage means at least one of said idea words and phrases records stored in said second database based upon an operator input and displaying for viewing on said display means a predetermined alphabetized subset of said idea words and phrases;

said display means comprising a video display terminal, said computer program being adapted to create separate windows of information for display on said terminal and having the capability of displaying at least three windows simultaneously, one of said windows for selectively displaying said list of major categories and said list of topical categories, a second one of said windows for displaying said words and phrases for a first selected one of said sections for a selected one of said topical categories, a third one of said windows for displaying said words and phrases for a second selected one of said sections for another selected one of said topical categories, said computer program having means for selectively and alternately displaying subsequently selected sections in said second and third windows.

2. The system defined by claim 1 wherein said storage means is for further storing of a third database created by operation of said computer program, said third database organized into a set of records containing a predetermined group of questions, one of said groups of questions being adapted to identify aims and elements of a task and for clarifying a goal; a second one of said groups of questions being adapted to alter, adapt, and shape ideas and potential solutions; and a third one of said groups of questions being adapted to assess goals, assumptions, ideas, potential solutions and outcomes, and wherein said computer program is adapted to display on said video display terminal one of said groups of questions based upon a user input.

3. The system defined by claim 1 wherein said storage means is for further storage of at least one notepad film created by operation of said computer program onto which major category titles, topical category titles and idea words and phrases selected by the user may be saved for subsequent retrieval.

4. The system defined by claim 1 wherein said major categories created by operation of said computer program comprises three conceptual groupings as follows:

a) the physical world;
   b) people, health, emotions and intellect; and
   c) actions, comparisons and attributes.

5. The system defined by claim 4 wherein said physical world conceptual grouping created by operation of said computer program comprises:

a) agriculture-plants-planting;
   b) animals;
   c) business-industry-occupations-money;
   d) clothing-jewelry-grooming;
   e) communication-education-entertainment-the arts;
   f) energy-machinery-technology;
   g) fasteners-containers-storage;
   h) foods-beverages-cooking-eating;
   i) government-law-politics;
   j) living quarter-furnishings;
   k) material-chemicals-gases;
   l) military-war;
   m) places;
   n) sports-recreation-hobbies;
   o) structures-repair-construction;
   p) transportation-travel; and
   q) weather.

6. The system defined by claim 4 wherein said people, health, emotions and intellect conceptual grouping created by operation of said computer program comprises:

a) emotions-behavior-personability;
   b) health-anatomy-medicine-the senses;
   c) mind-intellect;
   d) peoples-families-personal relationships-life cycle; and
   f) philosophy-religion-the occult.

7. The system defined by claim 4 wherein said actions, comparisons and attributes conceptual grouping created by operation of said computer program comprises:

a) actions-motions;
   b) color;
   c) comparison;
   d) measurement;
   e) shape; and
   f) time.

* * * * *

UNITED STATES PATENT AND TRADEMARK OFFICE
CERTIFICATE OF CORRECTION

PATENT NO. : 5,153,830

DATED : October 6, 1992

INVENTOR(S) : Fisher et al.

It is certified that errors appear in the above-identified patent and that said Letters Patent is hereby corrected as shown below:

In column 1 at line 63 change "associations to which" to -- associations-to which --.

In column 3 at lines 66-67, change "Mind-Intellect 'Peoples-Families-Personal Relationships-Life Cycle" to -- Mind-Intellect -- on line 66; and change line 67 to -- Peoples-Families-Personal Relationships-Life Cycle --.

In column 5 at line 10, the sentence "Topical Categories are grouped in the Major Categories" begins a new paragraph.

In column 7 at line 6 change "Miscellaneous p" to -- Miscellaneous --; and the sentence which begins "Still further" also begins a new paragraph.

In column 9 at line 9 and at line 18 change "window I" to --window 1 --; and at line 52 change "The" to -- the --.

In column 11 at line 38 change "lease" to -- least --.

UNITED STATES PATENT AND TRADEMARK OFFICE
CERTIFICATE OF CORRECTION

PATENT NO. : 5,153,830
DATED : October 6, 1993
INVENTOR(S) : Fisher et al.

It is certified that error appears in the above-indentified patent and that said Letters Patent is hereby corrected as shown below:

In column 12 at line 18 change "film" to --file--.

Signed and Sealed this

Second Day of May, 1995

Attest:

BRUCE LEHMAN

*Attesting Officer*  *Commissioner of Patents and Trademarks*